United States Patent
Ishikura

[11] Patent Number: 5,941,661
[45] Date of Patent: Aug. 24, 1999

[54] BEACH NOURISH WORK ON SHORE USING BED FOR WAVE DISSIPATION HAVING LATTICE FRAME AND CONSTRUCTION METHOD THEREOF

[75] Inventor: Kenji Ishikura, Hokkaido, Japan

[73] Assignee: Soken Kogyo Co., Ltd., Hokkaido, Japan

[21] Appl. No.: 08/909,269

[22] Filed: Aug. 11, 1997

[30] Foreign Application Priority Data

Aug. 9, 1996 [JP] Japan .................................. 8-242461

[51] Int. Cl.[6] .................................................. E02B 3/06
[52] U.S. Cl. ...................................................... 405/25
[58] Field of Search ................... 405/16, 17, 19, 405/21, 25, 29, 33, 35

[56] References Cited

U.S. PATENT DOCUMENTS

| 9,309 | 1/1852 | Pray | 405/21 |
|---|---|---|---|
| 618,319 | 1/1899 | Averill | 405/35 |
| 1,165,194 | 12/1915 | Maccaferri | 405/16 |
| 1,489,428 | 4/1924 | Cushing | 405/21 |

FOREIGN PATENT DOCUMENTS

| 0 178 510 A2 | 4/1986 | European Pat. Off. . | |
|---|---|---|---|
| 2 598 162-A1 | 11/1987 | France . | |
| 58-222207 | 12/1983 | Japan | 405/21 |
| 63-47406 | 2/1988 | Japan | 405/21 |
| WO 95/06168 | 3/1995 | WIPO . | |

OTHER PUBLICATIONS

JPO English Abstract of Pub. No. 57019406, Jan. 2, 1982, Ishikura.

*Primary Examiner*—Tamara Graysay
*Assistant Examiner*—Frederick Lagman
*Attorney, Agent, or Firm*—Knobbe, Martens, Olson & Bear, LLP

[57] ABSTRACT

Beds for wave dissipation having a lattice frame are arranged near a shore line of a shore and wave dissipating materials are stacked on the beds to make a wave dissipating structure, and sand is accumulated on the land side behind the wave dissipating structure. The wave dissipating structure (20) constructed by placing and stacking wave dissipating materials on a lattice frame (10) sinks in proportion to the amount of sand scoured away around the structure or at the bottom thereof, without scattering of the wave dissipating materials by ocean waves, the sinking stops when the effect of ocean waves is not exerted, ocean waves collide with the head part of the wave dissipating structure, crushed waves containing a lot of sand rushes up, and the carried sand is left in backwashing to be accumulated on the land side behind the wave dissipating structure (20). Thus, the sand ground surface (8) rises to a place (9).

6 Claims, 3 Drawing Sheets

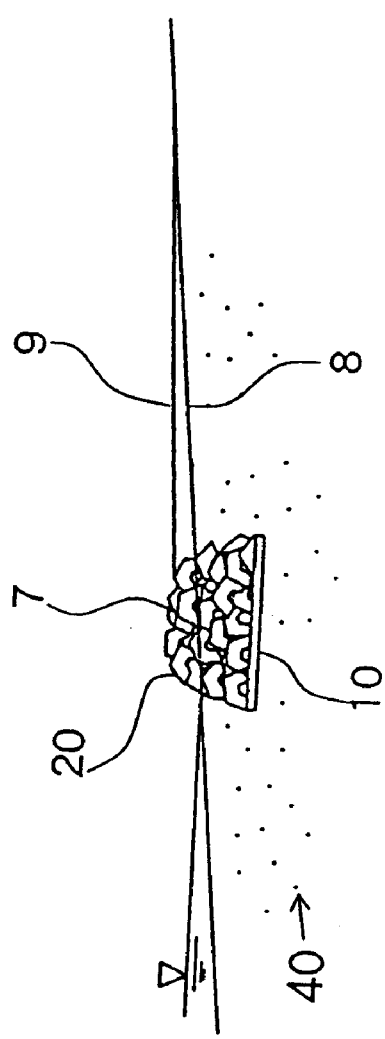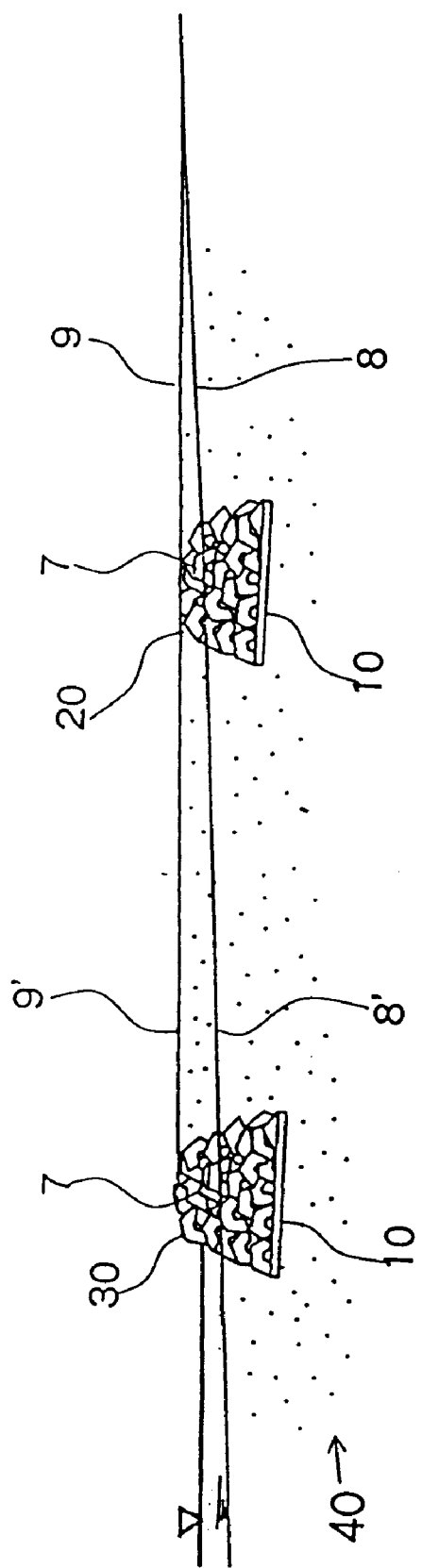

BEACH NOURISH WORK ON SHORE USING BED FOR WAVE DISSIPATION HAVING LATTICE FRAME AND CONSTRUCTION METHOD THEREOF

BACKGROUND OF THE INVENTION

1. Field of the Invention

The present invention relates to a beach nourish work on a shore using a bed for wave dissipation having a lattice frame and a construction method thereof.

2. Description of the Related Art

A natural shore is continuously moving. Formerly, soil was transferred from the upstream of a river to the downstream, flowed out into the sea and was washed up on a shore, returned to the sea by a backwash and transferred to various places by a coastal current. In this way, a shore kept its balance.

Recently, however, a flood-control dam and a sand-trap dam constructed on the upstream of a river, a revetment provided for river improvement and the like interrupt the supplying source of sand to the downstream, further, a port is constructed on a shore and a jetty is constructed to prevent erosion of a shore, consequently, the environment of a shore changes, a balance between supply of sand to a shore and flow out of sand from the shore kept so far collapses, and then the amount of sand carried out increases more than the amount of sand supplied. This mechanism is a main cause for shore erosion.

Therefore, to protect a shore from erosion, a wave dissipating structure formed by merely stacking wave dissipating blocks near a shore line of a shore to buffer waves coming toward the land, a sloped revetment formed by arranging flat plate blocks on a slope having a gentle gradient, a revetment composed of a vertical retaining wall to directly prevent an ocean wave or the like are constructed. However, in the case of the wave dissipating structure composed of stacked blocks, even when sheets and mats are used under the structure, the corner of a deformed block often thrusts into the sheets and mats and makes a hole because of the concentrated load, and the sheets and mats are torn. Once torn, the crack easily spreads. Further, when a wave dissipating structure is constructed first, the wave dissipating structure does not sink much owing to the effect of the sheets and mats, therefore, the sheets and mats are intensely abraded by waves containing sand, and sometimes may become ragged in only a few months. Consequently, as shown in FIG. 1, blocks 7 collapse successively, and are finally completely scattered. This phenomenon occurs of course when the sheets and mats are not used at the bottom. Then, a breaking wave 4 rushes up vigorously as shown by mark 5 in FIG. 1, a backwash carries out sand in the offing direction as shown by dotted line 6, and waves which successively rush up move as indicated by marks 5' and 5" in FIG. 1, erosion of the shore progresses as indicated by marks 6' and 6" in FIG. 1 and the shore is eroded and decomposed. Thus collapsed and scattered blocks are exposed on a natural shore as ugly wrecks, and often disturb a rare scenic area praised because of white sand and green pine trees, which we Japanese greatly appreciate.

Further, in the case of a sloped revetment, the force of a wave rushing up is not suppressed at all, and a backwash flows vigorously through the bottom of the blocks, makes sand and blast of the foundation flow out and decomposes and scatters the flat plate blocks. Also regarding the vertical retaining wall, when a heavy storm occurs, the tide level rises extraordinarily, waves colliding with the vertical retaining wall washes and scours the foundation strongly, makes the wall collapse, and sometimes cracks it apart. The present inventors have previously developed and proposed to lay a lattice bed for wave dissipation formed by placing steel products lengthwise and crosswise on the ground at the bottom of water and further to stack successively a wave dissipating material such as blocks and the like on the bed to make a wave dissipating structure for scour protection of a slope such as a breakwater, a ripraped breakwater or the like (Japanese Patent Application Publication (JP-B) Nos. 60(1985)-17888 and 8(1996)-19658).

This technique will be illustrated by a drawing. FIG. 2 shows a bed 10 for wave dissipation having a lattice frame, and mark 1 indicates longitudinal inner partitioning materials and mark 2 indicates horizontal inner partitioning materials. It is intended to develop naturally a seaside place by placing beds 10 for wave dissipation having a lattice frame (hereinafter, referred to as "lattice frame 10") near and approximately parallel to a shore line and by stacking blocks and the like on the beds to construct a wave dissipating structure.

In a conventional wave dissipating structure near a shore line, since blocks are easily scattered, blocks having a weight several times as heavy as a required weight calculated from a designed wave height are used, and due to such large blocks used, a remarkable shore scene can not be seen and the scene is often remarkably disturbed.

Further, when a block is large, even if the void ratio does not vary depending on the size of the block, the void itself increases in size and consequently a wave flows through the void without substantial suppression of wave energy, therefore, the background is often cut out and eroded.

However, since there is no definite theory regarding the sinkage of a structure placed near a shore line, there has been no construction method in which a wave dissipating structure is placed near a shore line, and sand is accumulated naturally.

SUMMARY OF THE INVENTION

The object of the present invention is to provide a beach nourish work on a shore by a wave dissipating structure using the lattice frame 10 and a construction method thereof, to improve the present state of construction methods against shore erosion.

According to a first embodiment of this invention, there is provided a beach nourish work on a shore for forming a sand beach on the shore, wherein the beach nourish work essentially consists of wave dissipating structures and sand accumulated on the land side behind the wave dissipating structure.

Each of the wave dissipating structures is constructed from (a) a bed for wave dissipation having a lattice frame the inner which part of is partitioned by a material having the shear resistance and tensile resistance of channel steel, angle steel, H-steel, reinforced concrete or the like and which forms a lattice mesh of such size that wave dissipating materials such as stones or blocks are engaged to the partitioned part and do not fall out through the mesh and (b) the wave dissipating materials, such as stones or blocks which are placed and stacked on the bed, said wave dissipating structures being placed successively near and approximately parallel to a shore line in the state of being automatically sunk by ocean waves.

According to a second embodiment of this invention, there is provided a beach nourish work on a shore for forming a sand beach on the shore, wherein, the beach nourish work essentially consists of first wave dissipating structures, second wave dissipating structures constructed approximately in alignment and at a suitable distance from the first wave dissipating structures on the sea side in front of the first wave dissipating structures, and sand accumulated between the first and second wave dissipating structures which are parallel to the seashore and each other.

Each wave dissipating structure is constructed from (a) a bed for wave dissipation having a lattice frame the inner part of which is partitioned by materials having the shear resistance and tensile resistance channel steel, angle steel, H-steel, reinforced concrete or the like forming a lattice mesh of such size that wave dissipating material such as stones or blocks are engaged to the partitioned part and do not fall out through the mesh and (b) wave dissipating materials such as stones, blocks placed and stacked on the bed, said wave dissipating structures placed near and approximately parallel to a shore line of a shore.

According to a third embodiment of this invention, there is provided a construction method for a beach nourish work on a shore for forming a sand beach on the shore comprising the steps of:

placing beds for wave dissipation having a lattice frame the inner part of which is partitioned by a material having the shear resistance and tensile resistance of channel steel, angle steel, H-steel, reinforced concrete or the like and which forms a lattice mesh of such size that wave dissipating materials such as stones, blocks are engaged to the partitioned part and do not fall out through the mesh successively near and approximately parallel to a shore line of a shore, placing and stacking the wave dissipating materials such as stones, blocks on the bed to construct a wave dissipating structure, allowing the structure to be sunk automatically by ocean waves, and accumulating sand on the land side behind the wave dissipating structure.

According to a fourth embodiment of this invention, there is provided a construction method for a beach nourish work on a shore for forming a sand beach on the shore comprising the steps of:

placing beds for wave dissipating having a lattice frame the inner part of which is partitioned by a material having the shear resistance and tensile resistance of channel steel, angle steel, H-steel, reinforced concrete or the like and which forms a lattice mesh of such size that wave dissipating materials such as stones or blocks are engaged to the partitioned part and do not fall out through the mesh successively near and approximately parallel to a shore line of a shore, placing and stacking the wave dissipating materials such as stones, blocks on the beds to construct first wave dissipating structures, constructing second wave dissipating structures, further approximately parallel to and at a suitable distance from the first wave dissipating structures on the sea side in front of the first wave dissipating structures, and accumulating sand between the first and second wave dissipating structures which are parallel to each other.

In this procedure, the height of the wave dissipating structure of the present invention is so regulated that when the main body of the wave dissipating structure sinks by scouring away of sand around or at the bottom of the wave dissipating structure, the top of the wave dissipating structure is just buried under the sand ground, except when there is no special necessity.

The wave dissipating structure is buried under the sand ground saturated with sea water, and receives buoyancy which corresponds to the weight of sand excluded. Therefore, a weight determined by deducting the buoyancy U from the total weight W of the structure acts on the bottom surface $B_1$ of the structure. When this load becomes smaller than the bearing capacity of soil and the influence on the bottom surface $B_1$ by scouring of the ground sand due to wave wash disappears, balance is kept and the structure is stabilized.

The wave dissipating structure used for the beach nourish work of the present invention using a lattice frame sinks at only the place where the ground sand is scoured away around the structure or at the bottom thereof corresponding to the amount scoured away, without scattering of blocks by ocean waves, and the structure itself is not injured at all and the wave dissipation effect is not lost. Therefore, if the height of the crown of the wave dissipating structure is defined corresponding to the landform, a wave crushed by the wave dissipating structure leaves sand behind the structure, therefore, a smooth beach appears naturally. Thus, a beach nourish work is formed which can utilize natural wave power.

The above and other object, features, and advantages of the present invention will become apparent from the following description based on the accompanying drawings which illustrate and example of a preferred embodiment of the present invention.

BRIEF DESCRIPTION OF THE DRAWING

FIG. 6 is a side cross sectional view showing the state under sand has accumulated naturally at the back side of the wave dissipating structure of the present invention.

FIG. 7 is a side cross sectional view showing the state when the wave dissipating structures of the present invention are arranged in two lines parallel to each other, and sand is accumulated between them.

DETAILED DESCRIPTION OF THE PREFERRED EMBODIMENTS

Figure 1:
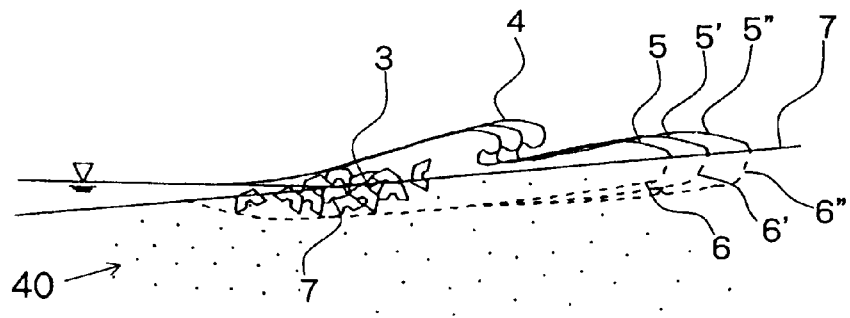
FIG. 1 is a schematic cross sectional view showing that a conventional wave dissipating structure collapses into scattered pieces by scouring of sand around the structure, the wave dissipation effect is lost, and a shore is scraped by waves rushing up.
Figure 2:
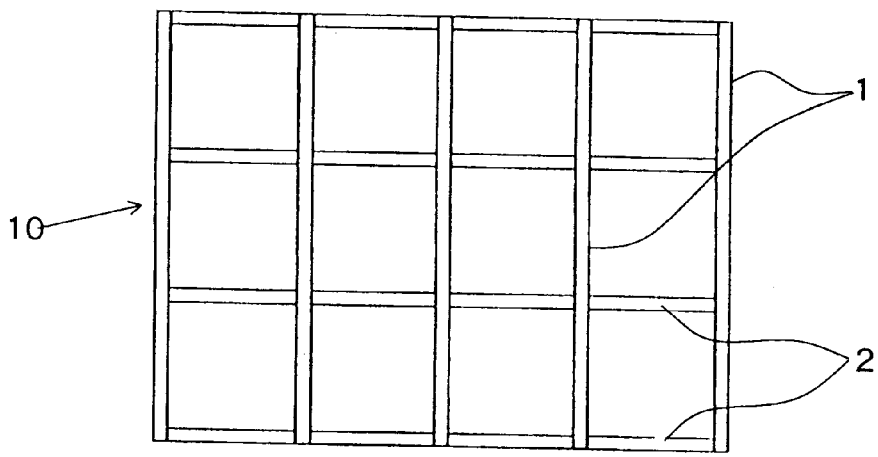
FIG. 2 is a plan view showing an example of a bed for wave dissipation having a lattice frame.
Figure 3:
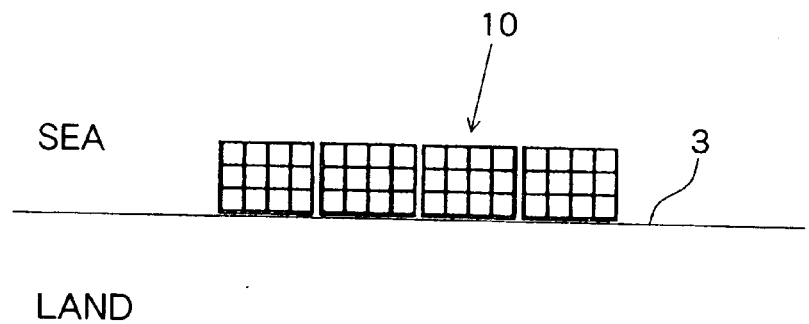
FIG. 3 is a plan view showing beds for wave dissipation having a lattice frame arranged near a shore line.

FIG. 2 indicates a lattice frame 10, mark 1 indicates a longitudinal inner partitioning material, and mark 2 indicates a horizontal inner partitioning material. The cross sectional area of the peripheral inner partitioning materials 1, 2 may be sometimes larger than that of the internal inner partitioning materials 1, 2. FIG. 3 indicates the condition that the lattice frames 10 are arranged near and approximately parallel to a shore line 3 which is a border of SEA and LAND.

Figure 4:
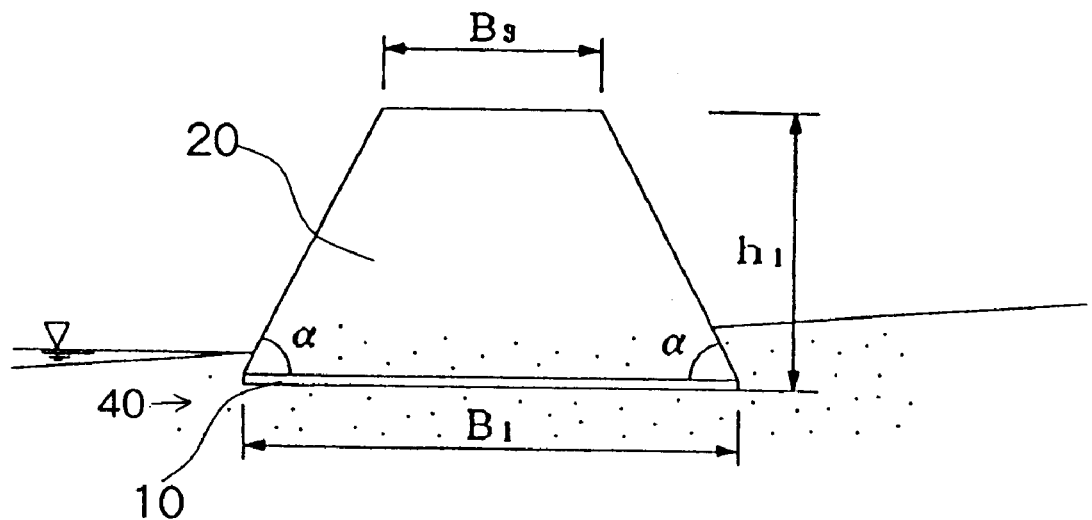
FIG. 4 is a side cross sectional view showing a state when the wave dissipating structure of the present invention using a bed for wave dissipation having a lattice frame is placed near shore line.

FIG. 4 indicates a wave dissipating structure 20 of the present invention constructed by placing the lattice frame 10 near a shore line of a shore, and placing and stacking wave dissipating materials having a size large enough to prevent them from falling out through the mesh of the above-described lattice frame 10. Mark $B_1$ indicates the width of the bottom surface of the above-described wave dissipating structure, mark $h_1$ indicates the total height, mark $B_3$ indicates the width of the crown, mark α indicates the angle made by the longitudinal surface and the horizontal surface, and mark 40 indicates the sand ground.

Figure 5:
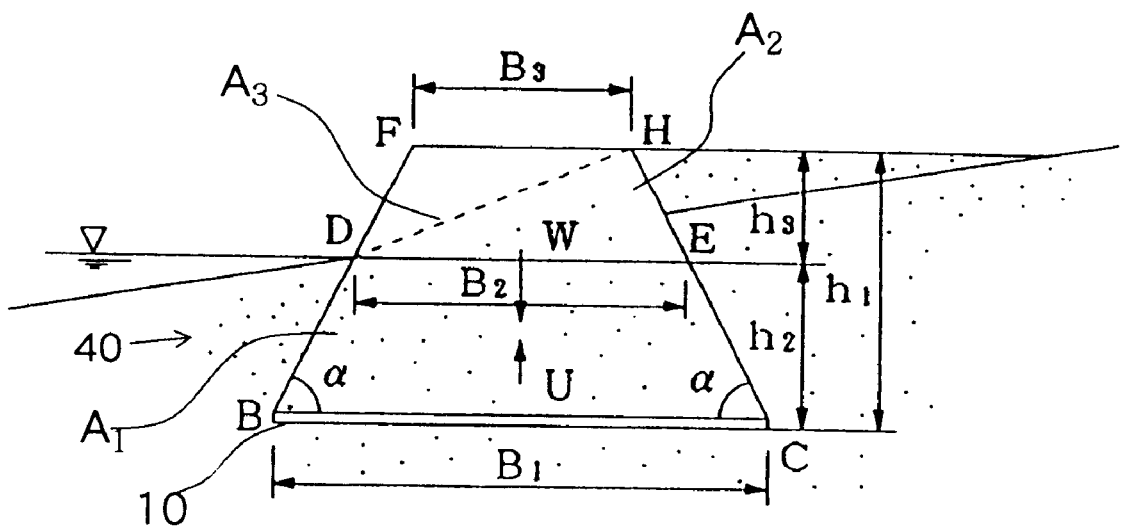
FIG. 5 is a side cross sectional view showing the sunken state of the wave dissipating structure of the present invention sunk by scouring away of sand due to a storm after the structure is placed.

FIG. 5 indicates the sunken state of the wave dissipating structure 20 of the present invention placed near a shore line sunk to a depth corresponding to the amount of sand scoured from around the wave dissipating structure due to a storm. When such sinking occurs, most of the structure is buried under the sand ground saturated with sea water and receives buoyancy U corresponding to the weight of sand excluded. Mark B2 is a width of the upper end surface of the buried part of the structure. Thus, the difference between the total weight W on the bottom surface $B_1$ of the structure, and the structure may be designed to satisfy the relation represented by the formula $$P = (W-U)/B_1 < \text{bearing capacity of soil}/F \quad (1)$$

(wherein, mark F indicates a safety factor.). In general, the buoyancy U is very large, and the value P is far smaller than the bearing capacity of soil in the ordinary condition of the sand ground. Therefore, it is thought that sinking of the wave dissipating structure 20 is due only to the scouring of the sand ground by washing with ocean waves. Therefore, when the waves no longer have an effect on the bottom part of the structure, sinking of the wave dissipating structure 20 stops because the bearing capacity of soil is much larger than the weight after the buoyancy of the structure is deducted. It is important to prevent the wave dissipating materials from being scattered by scouring of the sand ground and this is the reason for use of the lattice frame 10 in the wave dissipating structure 20 of the present invention. When a storm occurs, however, sand on the front seaside side of the wave dissipating structure 20 is again scoured out, and waves collide strongly with the wave dissipating structure. However, since the wave is broken, its energy is greatly suppressed before breaking on shore. Therefore, in backwashing, sand is accumulated on the land side of the wave dissipating structure 20, the previously low land-side sand ground surface 8 rises up to the site indicated by mark 9 as shown in FIG. 6. FIG. 6 shows the condition of a beach thus newly developed.

A calculation example is shown as follows referring to FIG. 5. Area $A_1$ of trapezoid BCED: the part of the wave dissipating structure buried in the sand ground saturated with sea water. Area $A_2$ of ΔDEH: the part of the wave dissipating structure in the air, voids of which are filled with dry sand. Area $A_3$ of ΔDHF: the part of the wave dissipating structure in the air consisting only of wave dissipating blocks. When

| | |
|---|---|
| ρ: void ratio of the wave dissipating block | 0.52 |
| 1 − ρ: net volume ratio of the wave dissipating block | 1 − 0.52 = 0.48 |
| $\gamma_1$: unit weight of the wave dissipating block | 2.3 t/m³ |

$\gamma_2$: unit weight of sand in air
  = specific gravity of sand × void ratio
  = 2.6 × 0.5 = 1.3 t/m³

$\gamma_3$: unit weight of sand saturated with sea water
  = specific gravity of sand × void ratio + unit weight of sea water × (1 − void ratio of sand)
  = 2.6 × 0.5 + 1.03(1 − 0.5)
  = 1.815 ≈ 1.8 t/m³

$\gamma_4$: unit weight of sea water  1.03 t/m³ cot α = 2/3

$B_1$ = 6 m, $B_2$ = 4.66 m, $B_3$ = 4 m $h_1$ = 3 m, $h_2$ = 2 m, $h_3$ = 1 m

Weight of $A_1 = A_1[(1 − \rho)\gamma_1 + \rho \cdot \gamma_3]$
  $= A_1(0.48 \times 2.3 + 0.52 \times 1.8) = 2.04 \cdot A_1$ t/m³

Weight of $A_2 = A_2[(1 − \rho)\gamma_1 + \rho \cdot \gamma_2]$
  $= A_2(0.48 \times 2.3 + 0.52 \times 1.3) = 1.78 \cdot A_2$ t/m³

Weight of $A_3 = A_3 \gamma_1$
  $= A_3 \times 0.48 \times 2.3 = 1.104 \cdot A_3$ t/m³

Therefore, the total weight W of the wave dissipating structure is as follows.

$$W = \text{weight of } (A_1 + A_2 + A_3)$$
$$= 2.04 A_1 + 1.78 A_2 + 1.104 A_3$$

The buoyancy U of the sand ground saturated with sea water is as follows.

$$U = A_1 \times \gamma_3 = 1.8 A_1 \text{ t/m}^3$$

Then, the load on the bottom surface BC of the wave dissipating structure is as follows.

$$W − U = 2.04 A_1 + 1.78 A_2 + 1.104 A_3 − 1.8 A_1 \quad (2)$$
$$= 0.24 A_1 + 1.78 A_2 + 1.104 A_3$$

$A_1 = \{(B_1+B_2)/2\} \times h_2 = \{(8+4.66)/2\} \times 2 = 12.66$ $A_2 = (1/2) \times B_2 \times h_3 = (1/2) \times 4.66 \times 1 = 2.33$ $A_3 = (1/2) \times B_3 \times h_3 = (1/2) \times 4 \times 1 = 2.0 \quad (3)$ When the formula (2) is calculated using the formulae (3), $$W − U = 0.24 \times 12.66 + 1.78 \times 2.33 + 1.104 \times 2.0 \quad (4)$$
$$= 9.3938 \approx 9.394 t, \text{ and}$$

$$(W−U)/B_1 = 9.394 \div 8 = 1.174 \text{ t/m}^2 \quad (5).$$

Since the sand ground of an ocean floor is a very firm sand ground if it is not disturbed by ocean waves, and since the bearing capacity of soil in this case is usually equal to several dozens t/m² or more, it is fully safe even when the safety factor is 2.5. Therefore, since the stacked wave dissipating blocks are not scattered when no effect is exerted on its bottom part by waves, as described above, the wave dissipating structure of the present invention stops to sinking and is stabilized as a structure.

FIG. 7 shows another embodiment of the present invention. Since the wave dissipating structure 20 of the present invention does not collapse even when a storm occurs, sand is accumulated on the land side behind the structure, however, sand sometimes accumulates for a certain period even on the sea side front of the wave dissipating structure 20 after the storm stops. During this period, a wave dissipating structured 30 of the present invention is placed in the same manner as described above near a new shore line on the sea side front of the above-described wave dissipating structure 20. Thus, sand is accumulated between the structure 20 and the structure 30, and consequently, a new beach 9' is developed, as shown in FIG. 7.

As is apparent from the above description, in the wave dissipating structure for a beach using a bed for wave dissipation having a lattice frame of the present invention, the blocks are not scattered even if waves cour a place around the wave dissipating structure or the bottom surface thereof, and the whole body of the structure sinks as one body in proportion to the amount of the sand ground scoured away, and is finally stabilized.

Thereafter, when a storm occurs, if the influence of a ocean wave is not exerted on the place around the wave dissipating structure or the bottom thereof, the wave is broken by the wave dissipating structure and breaks on shore with much of the energy suppressed. Therefore, there is no power left to wash out a shore, and on the contrary, a lot of sand is left in backwashing.

In this way, when the wave dissipating structure of the present invention is used, a strongly surging waves when a storm occurs are always broken, sand is accumulated on the land side behind the wave dissipating structure using a natural force, and the head part of the structure is almost buried under the sand ground in the ordinary condition, therefore, an extremely natural beach is recovered.

Therefore, by arranging the wave dissipating structures of the present invention in a line or in two or more lines parallel to and near a shore line, sand rushing up with a wave onto a shore can be trapped without allowing it to flow back into ocean, therefore, a shore can recover to the previously existing shore line.

Since the place on which the wave dissipating structure is placed is near a shore line, it is easy to conduct construction when a calm occurs, and when a storm occurs, waves surge up and the power of the wave makes the wave dissipating structure sink to a necessary and sufficient depth, without fail.

Also for accumulation of sand behind the wave dissipating structure, there can be used the phenomenon that a natural wave broken by the wave dissipating structure carries sand. In this way, a problem which has been most difficult to be solved so far can be solved by a structure utilizing only natural force.

It is to be understood, however, that although the characteristics and advantages of the present invention have been set forth in the foregoing description, the disclosure is illustrative only, and changes may be made in the arrangement of the parts within the scope of the appended claims.

What is claimed is:

1. A method for forming a beach using a plurality of wave-dissipating structures on a shore, each of said wave-dissipating structures comprising: (a) a bed for wave dissipation having a lattice frame partitioned by a rigid material forming a lattice mesh: and (b) wave-dissipating materials mounded on the bed, said wave-dissipating materials being engaged with said lattice mesh, said method comprising the steps of:

designing the wave-dissipating structure to satisfy Equation (1) when the structure sinks in the sand to a depth to which the wave-dissipating structure sinks in sand due to the scouring of sand by waves where the wave-dissipating structure is located:

$$(W-U)/B_1 \leq C/F \qquad (1)$$

wherein $B_1$ (m) is the width of the bottom of the wave-dissipating structure on the sea or land side, W ($t/m^2$) is the total weight on the bottom of the wave-dissipating structure, U ($t/m^2$) is the buoyancy of the wave-dissipating structure, C ($t/m^2$) is the bearing capacity of soil of the sand ground where the structure is placed, and F is a safety factor;

placing beds of the wave-dissipating structures in alignment with and adjacent to a shoreline of sea and land, said beds having a lattice frame partitioned by a rigid material forming a lattice mesh;

mounding wave-dissipating materials to form the wave-dissipating structures, wherein said wave-dissipating materials are engaged with said lattice mesh; and naturally accumulating sand on the land side behind said wave-dissipating structures by backwashing wherein the structure is naturally settled in sand to form a beach.

2. The method according to claim 1, wherein said rigid material is selected from the group consisting of channel steel, H-steel, and reinforced concrete.

3. The method according to claim 1, wherein said wave-dissipating materials are selected from the group consisting of stones and blocks.

4. The method according to claim 1, further comprising the steps of:

designing a second wave-dissipating structure to satisfy Equation (1) when the structure sinks in the sand to a depth to which the wave-dissipating structure sinks in sand due to the scouring of sand by waves where the wave-dissipating structure is located:

$$(W-U)/B_1 \leq C/F \qquad (1)$$

wherein $B_1$ (m) is the width of the bottom of the wave-dissipating structure on the sea or land side, W ($t/m^2$) is the total weight on the bottom of the wave-dissipating structure, U ($t/m^2$) is the buoyancy of the wave-dissipating structure, C ($t/m^2$) is the bearing capacity of soil of the sand ground where the structure is placed, and F is a safety factor;

placing beds of the second wave-dissipating structures in alignment with and adjacent to a shoreline of sea and land, said beds having a lattice frame partitioned by a rigid material forming a lattice mesh, said beds of the second wave-dissipating structures being placed parallel to the first beds of the wave-dissipating structures on the sea side;

mounding wave-dissipating materials to form the second wave-dissipating structures, wherein said wave-dissipating materials are engaged with said lattice mesh; and naturally accumulating sand between the first and second wave-dissipating structures by backwashing, wherein the structure is naturally settled in sand to form a beach.

5. The method according to claim 4, wherein said rigid material is selected from the group consisting of channel steel, H-steel, and reinforced concrete.

6. The method according to claim 4, wherein said wave-dissipating materials are selected from the group consisting of stones and blocks.

* * * * *